United States Patent
Oohira

(10) Patent No.: US 8,243,227 B2
(45) Date of Patent: Aug. 14, 2012

(54) LIQUID CRYSTAL DISPLAY DEVICE HAVING REDUCED OUTER DIMENSIONS

(75) Inventor: Eiji Oohira, Mobara (JP)

(73) Assignees: Hitachi Displays, Ltd., Chiba-Ken (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 0 days.

(21) Appl. No.: 13/064,226

(22) Filed: Mar. 11, 2011

(65) Prior Publication Data

US 2011/0164197 A1 Jul. 7, 2011

Related U.S. Application Data

(63) Continuation of application No. 11/987,960, filed on Dec. 6, 2007, now Pat. No. 7,929,072.

(30) Foreign Application Priority Data

Dec. 8, 2006 (JP) ................... 2006-331786

(51) Int. Cl.
 *G02F 1/1333* (2006.01)
(52) U.S. Cl. ............. 349/58; 345/94; 345/100; 252/299
(58) Field of Classification Search .................... 349/58; 345/94, 100; 252/299
See application file for complete search history.

(56) References Cited

U.S. PATENT DOCUMENTS

| 2003/0223020 A1* | 12/2003 | Lee .................................. 349/58 |
| 2005/0062902 A1* | 3/2005 | Fukayama ....................... 349/58 |
| 2008/0273136 A1 | 11/2008 | Hisada |
| 2009/0268121 A1* | 10/2009 | Hisada ............................ 349/58 |

FOREIGN PATENT DOCUMENTS

| JP | 2005-338497 | 12/2005 |
| JP | 2007-232809 A | 9/2007 |

* cited by examiner

*Primary Examiner* — Huyen Ngo
(74) *Attorney, Agent, or Firm* — Stites & Harbison, PLLC; Juan Carlos A. Marquez, Esq

(57) ABSTRACT

An object of the present invention is to reduce the exterior of a display device while retaining a display screen at a certain size. A liquid crystal display panel including a TFT substrate formed with a glass substrate and a color filter substrate is stored in a frame made of a metal. In order to avoid the direct contact between the glass substrate and the frame made of a metal, part of an optical sheet included in a backlight disposed behind the liquid crystal display panel is extended to lie between the liquid crystal display panel and the frame, and is regarded as a spacer. Since the thickness of the optical sheet is as small as 0.06 mm, the spacer hardly affects the external dimensions of a display device. Consequently, while a crack of the glass substrate is prevented, the exterior of the display device can be reduced.

4 Claims, 19 Drawing Sheets

A-A

B-B

FIG.4A
FIG.4C
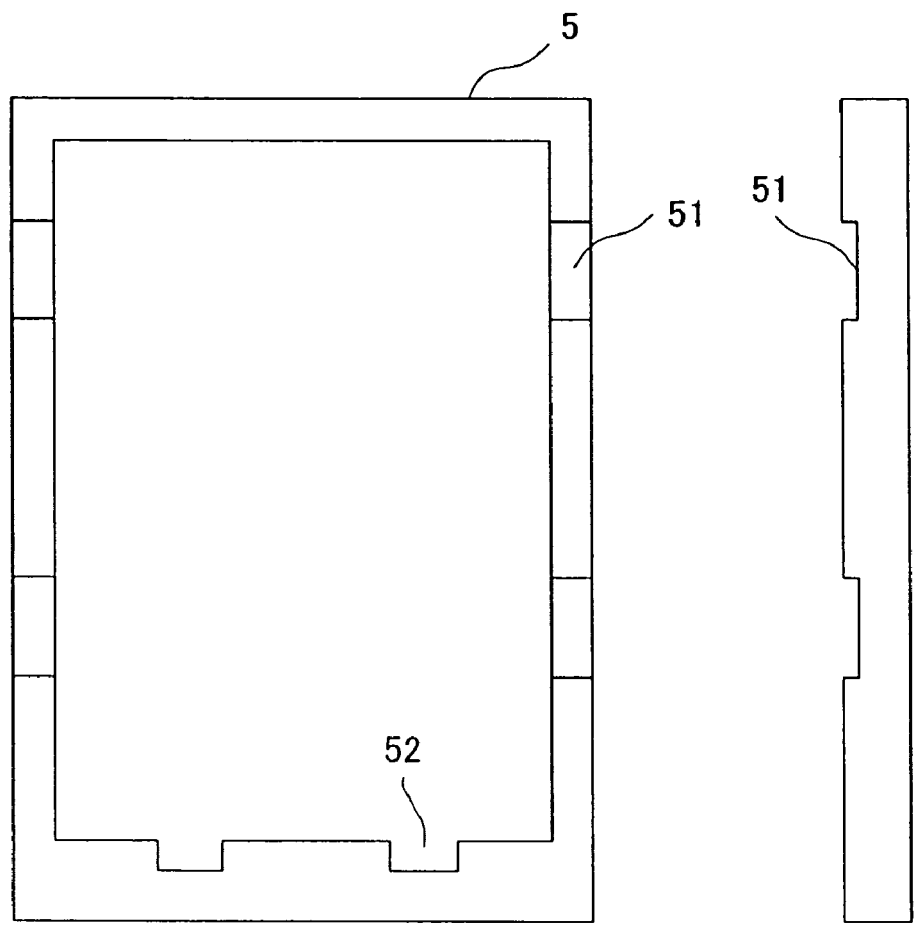
FIG.4B

FIG.6A
FIG.6C
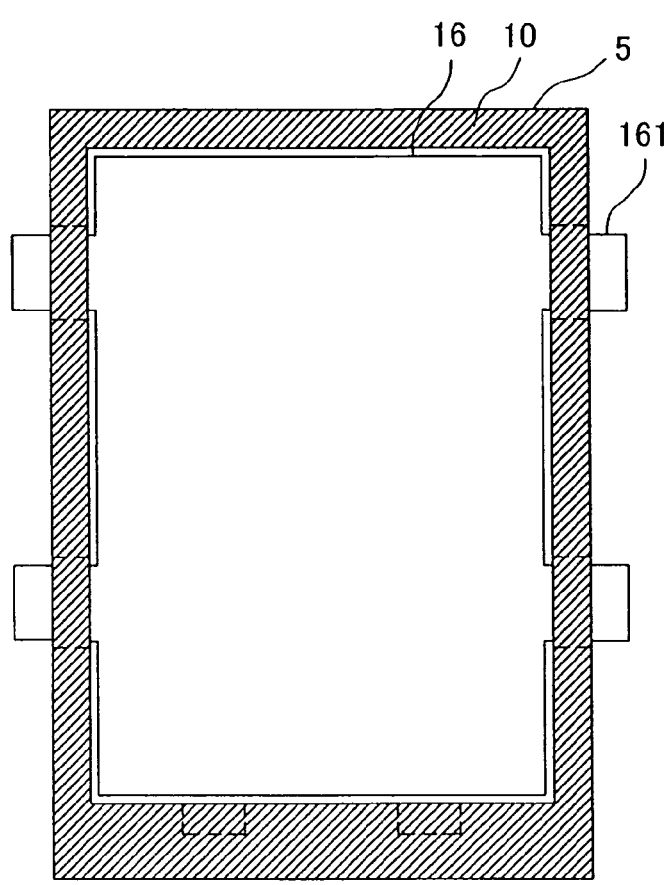
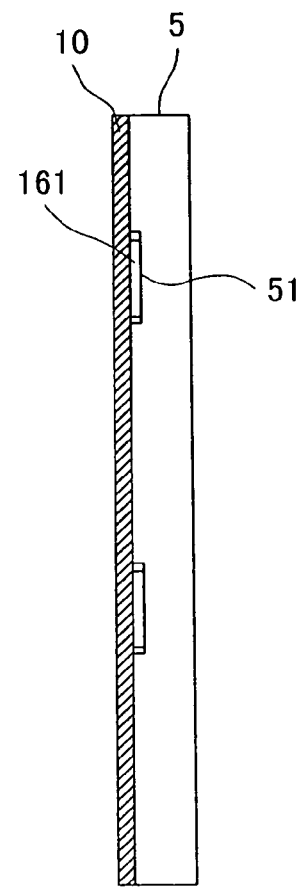
FIG.6B
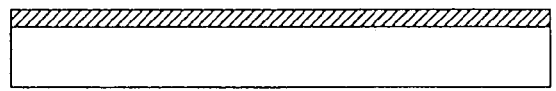

LIQUID CRYSTAL DISPLAY DEVICE HAVING REDUCED OUTER DIMENSIONS

CLAIM OF PRIORITY

This application is a Continuation of U.S. patent application Ser. No. 11/987,960 filed Dec. 6, 2007, now U.S. Pat. No. 7,929,072 which claims priority from Japanese Application JP 2006-331786 filed on Dec. 8, 2006, the content of which is hereby incorporated by reference into this application.

BACKGROUND OF THE INVENTION

1. Field of the Invention

The present invention relates to a liquid crystal display device, or more particularly, to a technology for reducing the external dimensions of a compact display device set for portable cellular phones or the like.

2. Description of the Related Art

As for liquid crystal display devices, there is an intense demand for reduction in the external dimensions of a display device set with a certain size of a screen kept intact. A liquid crystal display device for portable cellular phones or any other display device whose set should have the external size thereof made small is especially intensely demanded to have small external dimensions.

FIG. 24 is a plan view of a module of a conventional compact liquid crystal display device to be used for portable cellular phones. In FIG. 24, a liquid crystal display panel includes a TFT substrate 1 in which pixel electrodes, thin-film transistors (TFTs), data signal lines, and scan lines are formed, a color filter substrate 2 in which color filters or the like are formed, an upper sheet polarizer 7 bonded to the color filter substrate 2, and a lower sheet polarizer 8 that is not shown and is bonded to the bottom of the TFT substrate 1. The portions of the substrates to which the sheet polarizers are bonded may be considered as an effective field in which an image is formed. The TFT substrate 1 is made larger than the color filter substrate 2 in order to attach an IC driver 4 which drives the liquid crystal display panel, and a flexible wiring substrate, which is used to feed power or signals to the liquid crystal display panel, to the TFT substrate 1.

A backlight that irradiates light to the liquid crystal display panel from behind is disposed under the lower sheet polarizer 8. The liquid crystal display panel and backlight are stored in a resin mold 5. The flexible wiring substrate 3 attached to the TFT substrate 1 is folded up to the back of the resin mold 5 while covering the short-side part of the resin mold 5. In FIG. 21, the edge of the folded flexible wiring substrate 3 is seen.

The resin mold 5 in which the liquid crystal display panel and backlight are stored, and the flexible wiring substrate are stored in a frame usually made of a metal.

As a literature in which the foregoing structure is described, Japanese Patent Application Laid-Open Publication No. 2005-338497 is taken for instance.

The demand that the exterior of a display device should be made smaller with a certain size of a screen kept intact is getting more and more intense. In FIG. 24, as a means for further reducing the exterior, it is conceivable to, for example, decrease the thickness of the flank of the resin mold 5. The resin mold 5 is manufactured by performing injection molding. A lower limit of thicknesses to be attained through fabrication based on the injection molding is 0.45 mm. For a thickness equal to or smaller than 0.45 mm, the injection molding cannot be employed. Consequently, there are limitations in reducing the exterior of the conventional structure shown in FIG. 24.

If the resin mold 5 interposed between the liquid crystal display panel and the frame 6 is excluded, the exterior of the frame 6 can be reduced by a magnitude equivalent to the thickness of the resin mold 5. However, in this case, the color filter substrate 2 or TFT substrate 1 that is made of a glass and the frame 6 that is made of a metal would come into direct contact with each other. When a metal and a glass come into contact with each other, there is a risk that the glass may be cracked. In particular, if minute cracks were formed on an edge of a glass substrate, it would be quite hazardous.

Consequently, as long as the foregoing conventional structure is adopted, an attempt of reducing an exterior confronts limitations. If the exterior were reduced, it would bring about the risk that the glass substrate of the liquid crystal display panel may be cracked.

SUMMARY OF THE INVENTION

The present invention is intended to overcome the foregoing problem and to provide a construction that ensures a certain screen size and further reduces the exterior of a liquid crystal display device. The present invention removes the lateral part of a mold interposed between a frame and a liquid crystal display panel, disposes part of an optical sheet, which is included in a backlight, between a glass substrate and the frame for fear the glass substrate such as a TFT substrate or a color filter substrate may come into contact with the frame, and thus prevents the glass substrate and the frame made of a metal from coming into contact with each other. The thickness of the optical sheet is about 0.05 mm. An adverse effect of the thickness of the optical sheet on the external dimensions can be almost ignored compared with a case where a resin mold is employed. Concrete means will be described below.

(1) A liquid crystal display device includes: a liquid crystal display panel including a TFT substrate in which pixel electrodes and thin-film transistors (TFTs) each of which controls a signal to be fed to the pixel electrode are disposed in the form of a matrix, and a color filter substrate in which color filters associated with the pixel electrodes are formed; a backlight including multiple optical sheets and being placed on the back of the liquid crystal display panel; and a frame accommodating the liquid crystal display panel and the backlight. The frame has a lateral internal wall. Part of the optical sheet included in the backlight is interposed between the lateral internal wall of the frame and the liquid crystal display panel.

(2) In the liquid crystal display device set forth in paragraph (1), the frame is made of a metal.

(3) In the liquid crystal display device set forth in paragraph (1), part of the optical sheet included in the backlight and interposed between the lateral internal wall of the frame and the liquid crystal display panel serves as a spacer for preventing the frame and the liquid crystal display panel from coming into contact with each other.

(4) In the liquid crystal display device set forth in paragraph (1), part of the optical sheet included in the backlight and interposed between the lateral internal wall of the frame and the liquid crystal display panel is part of an optical sheet on the uppermost layer of the backlight.

(5) In the liquid crystal display device set forth in paragraph (1), parts of the multiple optical sheets included in the backlight are interposed between the lateral internal wall of the frame and the liquid crystal display panel.

(6) In the liquid crystal display device set forth in paragraph (1), parts of the multiple optical sheets included in the backlight are layered to lie between the lateral internal wall of the frame and the liquid crystal display panel.

(7) In the liquid crystal display device set forth in paragraph (1), parts of the multiple optical sheets included in the backlight are located in different places between the lateral internal wall of the frame and the liquid crystal display panel.

(8) A liquid crystal display device includes: a liquid crystal display panel including a TFT substrate in which pixel electrodes and TFTs each of which controls a signal to be fed to the pixel electrode are disposed in the form of a matrix; a backlight including multiple optical sheets and being placed on the back of the liquid crystal display panel; and a frame accommodating the liquid crystal display panel, the backlight, and a flexible wiring substrate that is attached to the TFT substrate and that is extended to the back of the backlight. The frame has a lateral internal wall. Part of the optical sheet included in the backlight is interposed between the lateral internal wall of the frame and the liquid crystal display panel.

(9) In the liquid crystal display device set forth in paragraph (8), part of the optical sheet included in the backlight and interposed between the lateral internal wall of the frame and the liquid crystal display panel exists on the long sides of the liquid crystal display panel.

(10) In the liquid crystal display device set forth in paragraph (8), part of the optical sheet included in the backlight and interposed between the lateral internal wall of the frame and the liquid crystal display panel exists on a side of the liquid crystal display panel opposite to the side thereof on which the flexible wiring substrate is attached.

(11) A liquid crystal display device includes: a liquid crystal display panel including a TFT substrate in which pixel electrodes and TFTs that each control a signal to be fed to the pixel electrode are disposed in the form of a matrix, and a color filter substrate in which color filters associated with the pixel electrodes are formed; a backlight including multiple optical sheets and being placed on the back of the liquid crystal display panel; and a frame accommodating the liquid crystal display panel, backlight, and a flexible wiring substrate that is attached to the TFT substrate and that is extended to the back of the backlight. The frame has a lateral portion and a lateral internal wall. Part of the lateral portion of the frame corresponding to part of the TFT substrate to which the flexible wiring substrate is attached is notched. Part of the optical sheet included in the backlight is interposed between the lateral internal wall of the frame and the liquid crystal display panel.

(12) In the liquid crystal display device set forth in paragraph (11), part of the optical sheet included in the backlight and interposed between the lateral internal wall of the frame and the liquid crystal display panel exists on the side of the liquid crystal display panel on which the flexible wiring substrate is attached.

(13) In the liquid crystal display device set forth in paragraph (11), part of the lateral portion of the frame corresponding to part of the TFT substrate to which the flexible wiring substrate is attached is notched. The ends of the notched portion of the lateral portion of the frame are folded back.

(14) A liquid crystal display device includes: a liquid crystal display panel including a TFT substrate in which pixel electrodes and TFTs each of which controls a signal to be fed to the pixel electrode are disposed in the form of a matrix, and a color filter substrate in which color filters associated with the pixel electrodes are formed; a backlight including multiple optical sheets and being placed on the back of the liquid crystal display panel; and a frame accommodating the liquid crystal display panel, backlight, and a flexible wiring substrate that is attached to the TFT substrate and that is extended to the back of the backlight. The frame has a lateral portion and a lateral internal wall. Part of the lateral portion of the frame corresponding to part of the TFT substrate to which the flexible wiring substrate is attached is jutted out. Part of the optical sheet included in the backlight is interposed between the lateral internal wall of the frame and the liquid crystal display panel.

Owing to the foregoing means, the present invention makes it possible to reduce the exterior of a liquid crystal display device while ensuring a certain screen size. An advantage provided by each means will be described below.

According to the means (1) to the means (3), part of the thin optical sheet employed in the backlight is used as a spacer between a glass substrate such as the TFT substrate or color substrate and the frame made of a metal. Consequently, the glass substrate and frame can be prevented from coming into direct contact with each other. Moreover, the exterior of the display device can be reduced. Consequently, while a screen size and reliability are ensured, the exterior of the liquid crystal display device can be reduced.

According to the means (4), in addition to the advantage provided by the means (1) to means (3), a construction is simplified because the optical sheet existing on the uppermost layer of the backlight is used as a spacer.

According to the means (5), in addition to the advantage provided by the means (1) to means (3), freedom in determining the specification for a spacer expands because parts of the multiple optical sheets are used as a spacer.

According to the means (6), in addition to the advantage provided by the means (1) to means (3), freedom in determining the space between the liquid crystal display panel and the frame expands because parts of the multiple optical sheets are layered and used as a spacer.

According to the means (7), in addition to the advantage provided by the means (1) to means (3), since the multiple optical sheets are used as a spacer, as long as the shape of each optical sheet is optimally determined, a material yield or a yield in machining the material of the optical sheets can be upgraded.

According to the means (8) to means (10), on the side on which the flexible wiring substrate is attached to the TFT substrate, the flexible wiring substrate is used as a spacer for preventing the liquid crystal display panel and the frame from coming into contact with each other. On the other side, part of the optical sheet is used as a spacer. Consequently, the contact between the liquid crystal display panel and the frame can be reliably prevented.

According to the means (11) to means (13), part of the lateral portion of the frame corresponding to part of the liquid crystal display panel to which the flexible wiring substrate is attached is notched. An increase in the dimensions of the frame derived from the attachment of the flexible wiring substrate can be suppressed. At the same time, since part of the optical sheet is used to prevent the TFT substrate and the frame from coming into contact with each other, the TFT substrate can be protected from being cracked.

According to the means (14), part of the lateral portion of the frame corresponding to part of the liquid crystal display panel to which the flexible wiring substrate is attached is jutted out. Consequently, an increase in the dimensions of the entire frame can be suppressed. At the same time, since part of the optical sheet is used to prevent the FTF substrate and the frame from coming into contact with each other, the TFT substrate can be protected from being cracked.

BRIEF DESCRIPTION OF THE DRAWINGS

These and other features, objects and advantages of the present invention will become more apparent from the following description when taken in conjunction with the accompanying drawings wherein:

FIG. 4A to FIG. 4C show the shape of a resin mold;

FIG. 6 shows a combination of the resin mold and an optical member;

DESCRIPTION OF THE PREFERRED EMBODIMENTS

The detailed contents of the present invention will be disclosed below in relation to embodiments.

First Embodiment

Figure 1:
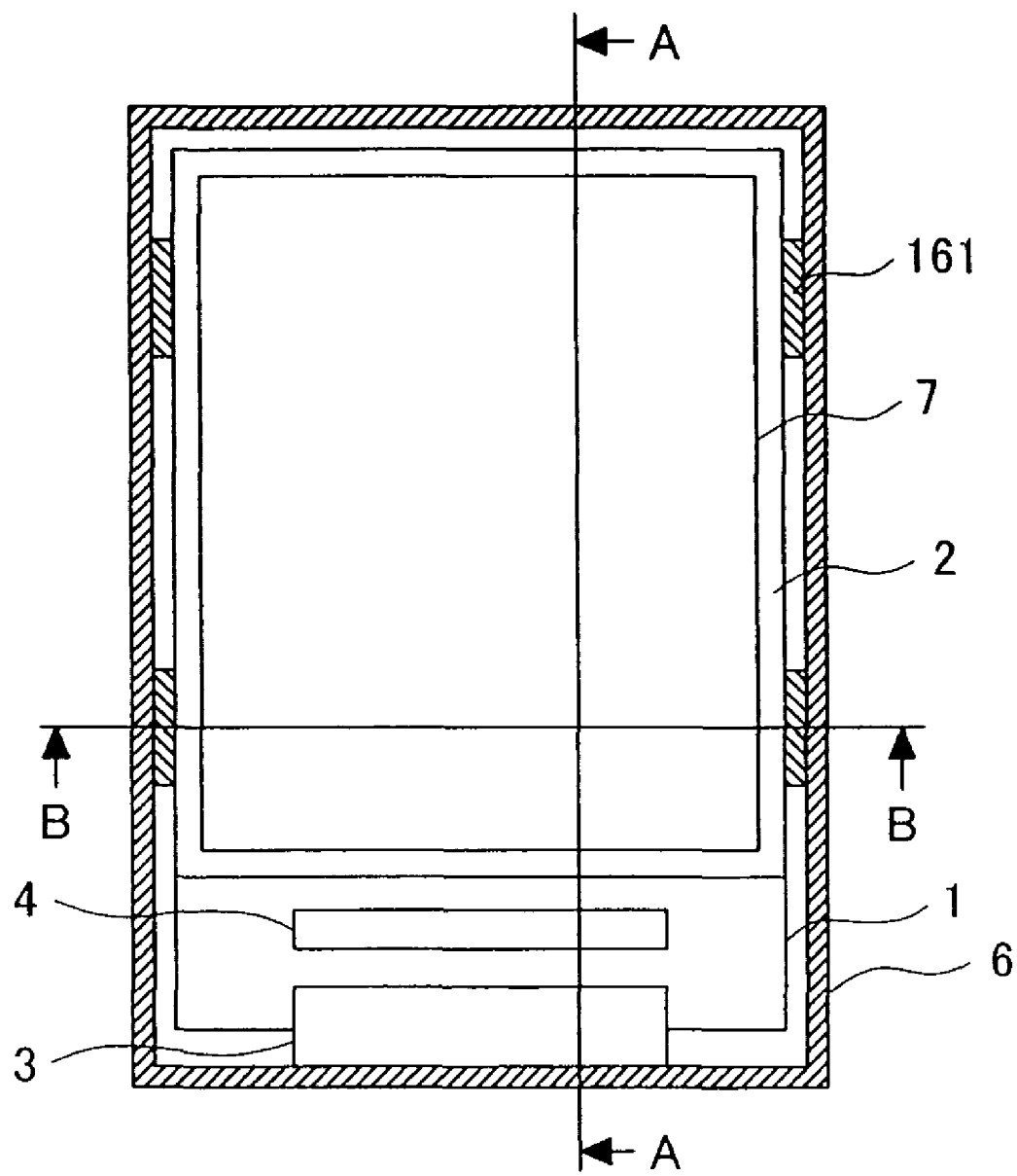
FIG. 1 is a plan view of a first embodiment.
Figure 2:
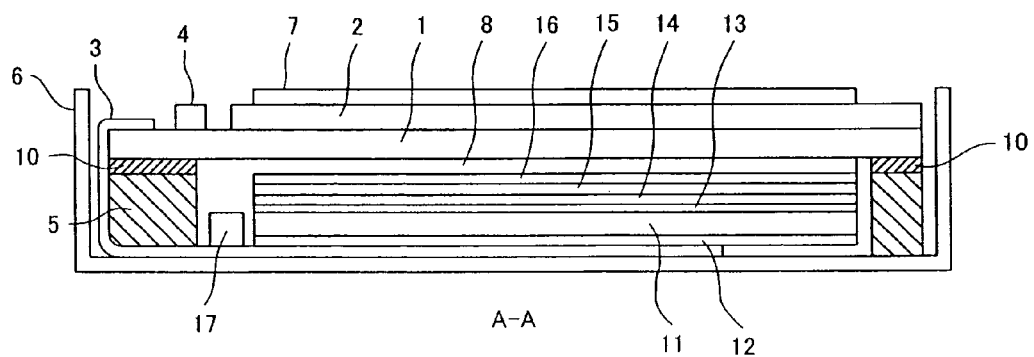
FIG. 2 is an A-A sectional view of the structure shown in FIG. 1.
Figure 3:
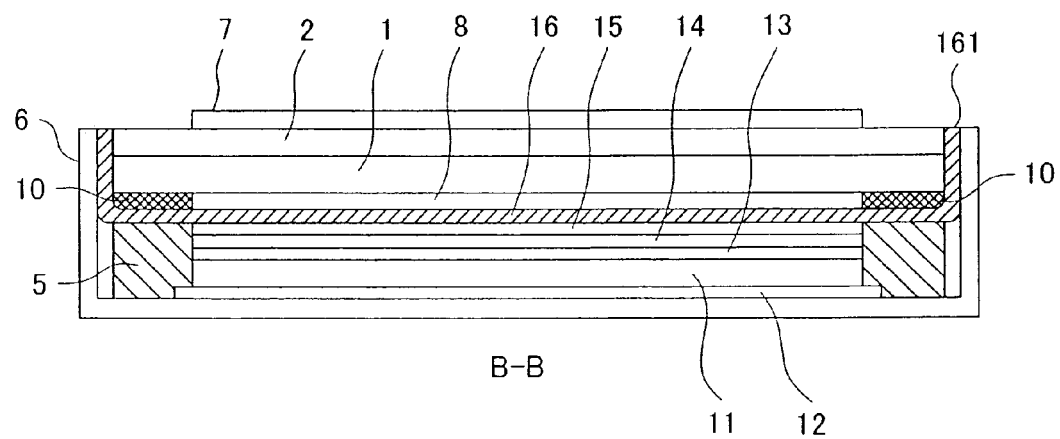
FIG. 3 is a B-B sectional view of the structure shown in FIG. 1.

FIG. 1 is a plan view showing a first embodiment of the present invention. FIG. 2 is an A-A sectional view of the structure shown in FIG. 1, and FIG. 3 is a B-B sectional view of the structure shown in FIG. 1. In FIG. 1, a color filter substrate 2 included in a liquid crystal display panel is placed on a TFT substrate 1. An upper sheet polarizer 7 is bonded to the top of the color filter substrate 2. The upper sheet polarizer 7 substantially corresponds to an effective screen of the liquid crystal display panel. The color filter substrate 2, the TFT substrate 1, the upper sheet polarizer 7, and a lower sheet polarizer 8 bonded to the bottom of the TFT substrate 1 constitute the liquid crystal display panel.

The TFT substrate 1 is designed to be larger than the color filter substrate 2 so that an IC driver 4 which drives the liquid crystal display panel and a flexible wiring substrate which feeds power and an image signal to the liquid crystal display panel can be disposed on the TFT substrate 1. In FIG. 1, the IC driver 4 and flexible wiring substrate are attached to the lower side of the TFT substrate 1.

The flexible wiring substrate 3 is folded down to the back of the liquid crystal display panel for the purpose of saving a space. The liquid crystal display panel and flexible wiring substrate 3 are stored in a frame 6 made of a metal. A spacer 161 that is part of an optical sheet is interposed between the liquid crystal display panel and frame 6, and thus prevents the glass substrate, which is included in the liquid crystal display panel, and the frame 6, which is made of a metal, from coming into contact with each other.

FIG. 2 is an A-A sectional view of the structure shown in FIG. 1. As described in conjunction with FIG. 1, the TFT substrate 1 and color filter substrate 2 are layered. In the TFT substrate 1, numerous pixels realized with pixel electrodes and TFTs each of which controls a signal sent to a pixel electrode are disposed in the form of a matrix. A liquid crystal is sealed between the TFT substrate 1 and color filter substrate 2. The liquid crystal controls pixel by pixel light which is emitted from the backlight, whereby an image is formed. Since the liquid crystal cannot control light other than polarized light, the lower sheet polarizer is bonded to the bottom of the TFT substrate 1 in order to polarize light emanating from the backlight. Light having been controlled pixel by pixel by the liquid crystal according to an image signal is polarized again by the upper sheet polarizer on the top of the color filter substrate 2, whereby an image is discerned by human eyes. A red, green, or blue filter is formed at each pixel in the color filter substrate 2, whereby a color image is formed.

The liquid crystal display panel is placed on a resin mold 5 with a light interceptive member 10 between them. The resin mold 5 does not, unlike the one in the related art, enclose the liquid crystal display panel. This is intended to reduce the exterior of the liquid crystal display device. As the light interceptive member 10, a black double-sided adhesive tape is generally adopted. Owing to the double-sided adhesive tape, the liquid crystal display panel and the resin mold 5 are secured.

The flexible wiring substrate 3 attached to the TFT substrate 1 is folded down to extend on the liquid crystal display panel and the back of a backlight. Light-emitting diodes (LEDs) 17 are attached to the flexible wiring substrate 3, and used as a light source of the backlight. Moreover, wiring or the like over which an image signal or power is fed from a host to the liquid crystal panel is formed on the flexible wiring substrate 3.

The backlight is formed under the liquid crystal display panel. The backlight is stored in the resin mold 5. In FIG. 2, light emanating from the LEDs 17 enters the lateral part of a light guide plate 11. In FIG. 2, only one LED 17 is seen. In reality, multiple LEDs 17 are disposed on the flank of the light guide plate 11. The role of the light guide plate 11 is to direct light, which comes through the flank of the light guide plate, toward the liquid crystal display panel. The light guide plate 11 is generally formed with a transparent acrylic plate.

A reflective sheet 12 is disposed under the light guide plate 1. The surface of the reflective sheet 12 on the side of the light guide plate is a mirror surface, and fills the role of reflecting light, which propagates downward from the light guide plate 11, and directing the light toward the liquid crystal display panel. A lower diffuse sheet 13 is disposed on the light guide plate 11. Since the light source is realized with the LEDs 17 and is almost a point light source, light emitted from the light guide plate 11 toward the liquid crystal display panel has unevenness in the intensity thereof because of the fact that the point light source is adopted. The role of the diffuse sheet is to bring light from the light guide plate 11 to homogeneous line. The thickness of the lower diffuse sheet 13 is, for example, 0.04 mm.

A lower prism sheet 14 and an upper prism sheet 15 are placed on the lower diffuse sheet 13. The prism sheet is a sheet having numerous prisms, whose sections extending in one direction are triangular, formed on one side thereof at intervals of a fine pitch. The pitch between adjoining prisms is, for example, 0.05 mm. The prism sheet fills the role of improving the efficiency of the backlight by focusing light in the directions of the vertexes of the triangular sections of the prisms so as to thus direct light emanating from the backlight toward the liquid crystal display panel.

The direction in which the prisms are extending on the lower prism sheet 14 is nearly perpendicular to the direction in which the prisms are extending on the upper prism sheet 15. For example, the lower prism sheet 14 directs light, which propagates rightward or leftward on the screen, toward the liquid crystal display panel, while the upper prism sheet 15 directs light, which propagates upward or downward on the screen, toward the liquid crystal display panel. Consequently, light emanating from the backlight is efficiently directed toward the liquid crystal display panel. As for the thicknesses of the prism sheets, both the lower prism sheet 14 and upper prism sheet 15 have a thickness of about 0.06 mm.

An upper diffuse sheet 16 is placed on the upper prism sheet 15. The major role of the upper diffuse sheet 16 is to resolve or alleviate moiré occurring between the prism sheets and the liquid crystal display panel. When the prism sheet is seen on a plane, the vertexes of prisms and their surroundings are bright but the valleys and their surroundings are dark. In other words, shades are formed to be striped at intervals of a fine pitch. On the other hand, in the TFT substrate 1, image signal lines are formed in an up-and-down direction at intervals of a specific pitch, and scan signal lines are formed in a right-and-left direction at intervals of a specific pitch. The signal lines do not pass backlight. Therefore, when the screen is seen, bright pixel parts and dark parts of the signal lines or the like exist at intervals of a fine pitch. Consequently, the prism sheets and the liquid crystal display panel interfere with each other to cause moiré.

The upper diffuse sheet 16 fills the role of making the moiré inconspicuous by utilizing a hazing effect. By increasing the haze value of the upper diffuse sheet 16, the moiré gets more inconspicuous. However, the brightness of the screen is degraded. The upper diffuse sheet 16 is used to adjust the relationship between the moiré and brightness. The thickness of the upper diffuse sheet 16 is, for example, 0.06 mm. In FIG. 2, there is no gap between the upper diffuse sheet 16 and the lower diffuse sheet. In reality, the gap may often be created.

The mold accommodating the liquid crystal display panel and the backlight, and the flexible wiring substrate 3 folded down to the back of the backlight are stored in the frame 6 made of a metal. The portion of the flexible wiring substrate 3 folded down to the back of the backlight is clamped between the bottom of the backlight and the frame 6. The frame 6 is generally made of a stainless steel, and the thickness thereof is on the order of 0.3 mm.

FIG. 3 is a B-B sectional view of the structure shown in FIG. 1. The constructions of the liquid crystal display panel and backlight have been described in conjunction with FIG. 2. The reflective sheet 12 that is the lower part of the backlight is fitted into a recess formed in the lower part of the resin mold 5. Consequently, the space for the backlight enclosed by the resin mold 5, liquid crystal display panel, and reflective sheet 12 is sealed for fear a foreign matter may enter from outside.

In FIG. 3, the upper diffuse sheet 16 is extended to lie between the resin mold 5 and adhesive tape, led to outside the resin mold 5, and bent upward to serve as a spacer 161 between the frame 6 and the liquid crystal display panel. The upper diffuse sheet 16 has a thickness of 0.06 mm. The spacer 161 realized by the upper diffuse sheet 16 hardly affects the exterior. On the other hand, the contact between the glass substrate included in the liquid crystal display panel and the frame 6 made of a metal can be reliably prevented by the spacer 161.

Figure 5:
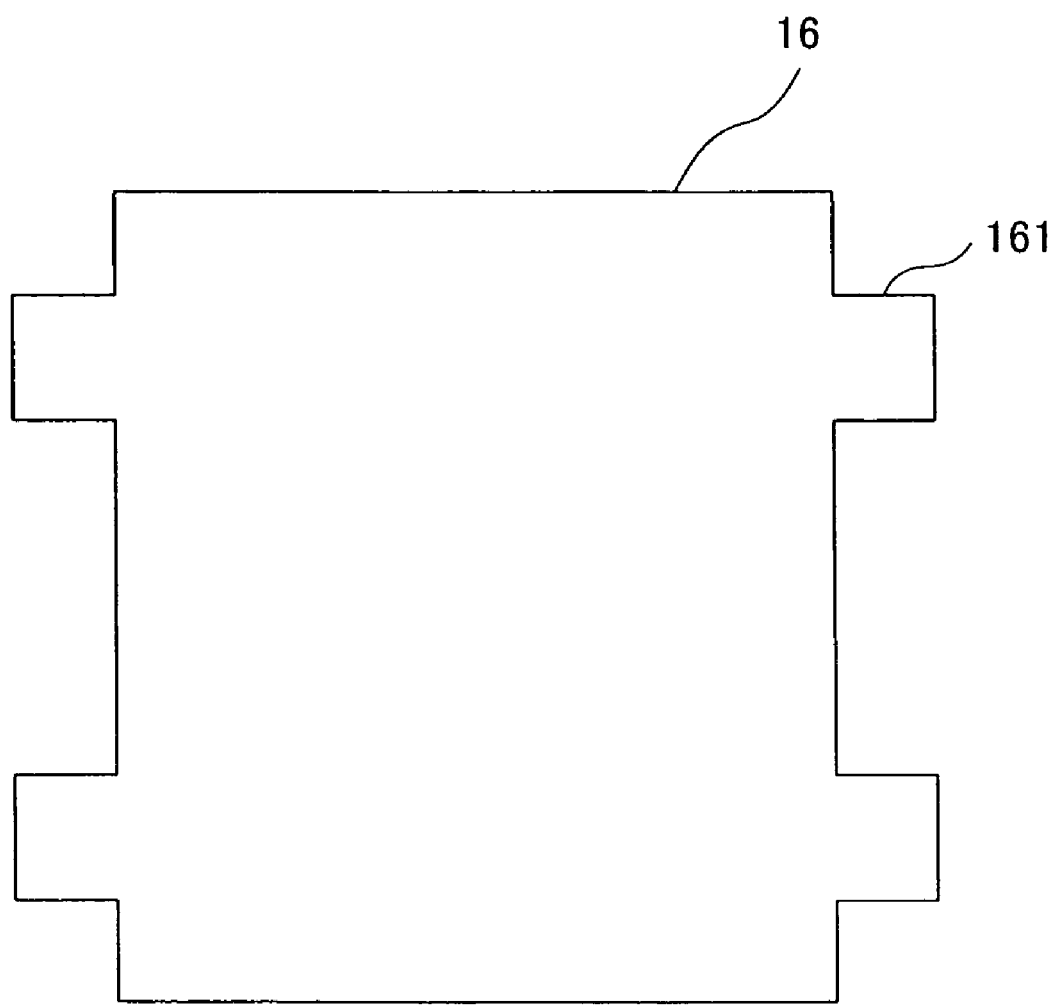
FIG. 5 is a plan view of an upper diffuse sheet.

As shown in FIG. 1, the upper diffuse sheet 16 does not have the entire perimeter thereof jutted out of the mold and bent upward. FIG. 4 and FIG. 5 show a concrete structure. FIG. 4A is a plan view of the resin mold 5, FIG. 4B is a side view thereof, and FIG. 4C is the other side view thereof. Internal recesses 52 shown in FIG. 4A are places to which the LEDs 17 are inserted. In top recesses 51 of the resin mold 5, the spacer portions of the upper diffuse sheet 16 are placed. Since the spacer portions of the upper diffuse sheet 16 exist at four respective positions, the top recesses 51 of the resin mold 5 are formed at four respective positions.

FIG. 5 shows the shape of the upper diffuse sheet. Juts constituting the spacer 161 are formed at four respective positions on the long sides of the upper diffuse sheet. The upper diffuse sheet has a thickness of 0.06 mm and is made of an acrylic material. In FIG. 5, the spacer portions of the upper diffuse sheet 16 are exaggerated for a better understanding. In reality, the spacer portions are minute juts and only slightly affect a material yield. Since the spacer portions of the upper diffuse sheet 16 are located at four respective positions, the top recesses 51 of the resin mold 5 are formed at four respective positions. Since the thickness of the upper diffuse sheet 16 is as small as 0.06 mm, the top recesses 51 of the resin mold 5 shown in FIG. 4C are so shallow as to have a depth of 0.06 mm.

After the spacer portions of the upper diffuse sheet 16 are placed in the top recesses of the resin mold 5, the entire top of the resin mold 5 is covered with a light interceptive film realized with a black double-sided adhesive tape. FIG. 6 shows this state. In FIG. 6, the optical sheets included in the backlight are stored in the resin mold 5. The upper diffuse sheet 16 exists as the uppermost one of the optical sheets. The jut portions of the upper diffuse sheet 16 serving as the spacer 161 are placed in the top recesses 51 of the resin mold 5.

When the liquid crystal display panel is placed on the black double-sided adhesive tape, the interior of the backlight is brought to a closed space by the resin mold 5 and liquid crystal display panel. After the resin mold 5 accommodating the backlight and the liquid crystal display panel are assembled, these parts are stored in the frame. At this time, the spacer portions of the upper diffuse sheet 16 are bent upward to serve as the spacer 161 between the frame 6 and the glass substrate included in the liquid crystal display panel. Since the upper diffuse sheet 16 is so thin as to have a thickness of 0.06 mm, it can be easily bent.

In the foregoing embodiment, the upper diffuse sheet 16 alone is used as the spacer 161 between the liquid crystal display panel and frame 6. In this case, the spacer between the glass substrate and frame 6 is 0.06 mm thick. In consideration of a deformation or the like of the frame 6 made of a metal, the spacer between the glass substrate and frame 6 may sometimes have to be thicker. In this case, multiple optical sheets are used as the spacer.

Figure 7:
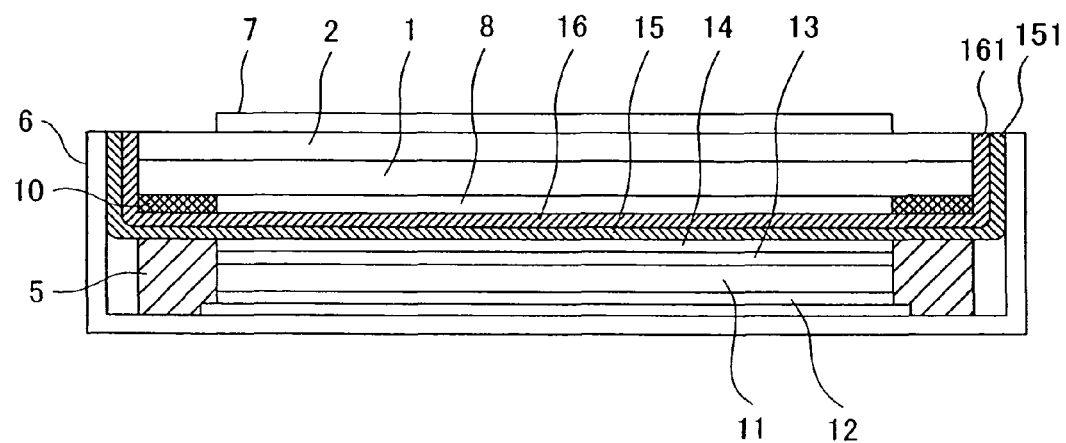
FIG. 7 is a sectional view showing another form of the first embodiment.

FIG. 7 is concerned with a case where both the upper diffuse sheet 16 and upper prism sheet 15 are used as a spacer. The outlines of the sheets are identical to those shown in FIG. 5. Both the upper diffuse sheet 16 and upper prism sheet 15 have a thickness of 0.06 mm. The space between the glass substrate of the liquid crystal display panel and the frame 6 is 0.12 mm wide. Even in this case, compared with a case where the resin mold 5 is interposed between the glass substrate and frame 6, the external dimensions are very little affected.

FIG. 7 shows an example in which the spacer 161 realized by the upper diffuse sheet 16 and a spacer 151 realized by the upper prism sheet are used as a spacer. If necessary, the other sheets may be employed. Assuming that all of the four optical sheets are used as the spacer, the thickness of the spacer is the sum total of the thicknesses of the sheets, that is, 0.22 mm that is the sum of the thicknesses of the lower diffuse sheet, lower prism sheet, upper prism sheet, and upper diffuse sheet of 0.04 mm, 0.06 mm, 0.06 mm, and 0.06 mm respectively. Even in this case, the thickness is equal to or smaller than a half of the lower limit of the thickness attained when the resin mold 5 is interposed between the glass substrate and frame 6.

Figure 8:
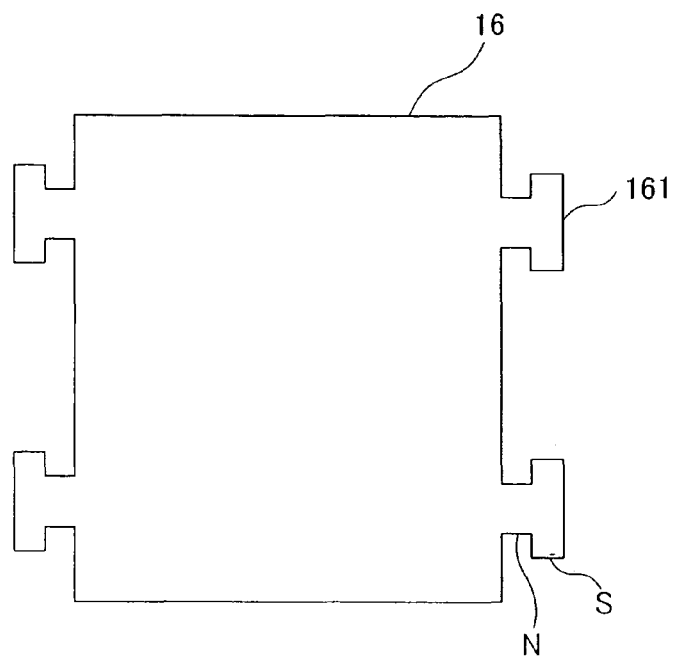
FIG. 8 shows another form of the upper diffuse sheet.

FIG. 8 shows another example of a case where the upper diffuse sheet 16 is employed as the spacer 161. In FIG. 8, the shape of the jut portions of the upper diffuse sheet 16 serving as the spacer 161 is modified. Namely, portions N shown in FIG. 8 are placed in the top recesses 51 of the resin mold 5, and portions S serve as the spacer 161 between the glass substrate of the liquid crystal display panel and the frame 6. The shape shown in FIG. 8 is characterized in that the portions N placed on the resin mold 5 are narrow and the portions serving as the spacer 161 are wide.

From the viewpoint of the spacer between the glass substrate of the liquid crystal display panel and the frame 6, the wider the spacer is, the securer it is. Specifically, even if the lateral part of the frame 6 undergoes an impact to slightly deform, the contact between the glass substrate and the frame 6 can be reliably prevented by the spacer 161. For the purpose of sealing the interior of the resin mold 5, the area of each of the top recesses of the resin mold 5 should not be very large. Since the portions N of the jut portions serving as the spacer are, as shown in FIG. 8, made small, the area of each of the top recesses 51 of the resin mold can be reduced. Furthermore, as shown in FIG. 8, if the narrow portions N are bent, the bending is easy to do. This advantage would be more deeply recognized especially when portions serving as a spacer are made very wide or multiple optical sheets are used as the spacer.

In the aforesaid embodiment, as shown in FIG. 3 and others, the TFT substrate 1 of the liquid crystal display panel is directly placed on the resin mold 5 with the light interceptive member 10 between them. On the other hand, for some products, the upper sheet polarizer 7 or lower sheet polarizer 8 may be bonded to the color filter substrate 2 or TFT substrate 1 so that it will almost reach the edges of the color filter substrate 2 or TFT substrate 1. In this case, the lower sheet polarizer 8 of the liquid crystal display panel is placed on the top of the resin mold 5 with the light interceptive member 10 between them.

Figure 9:
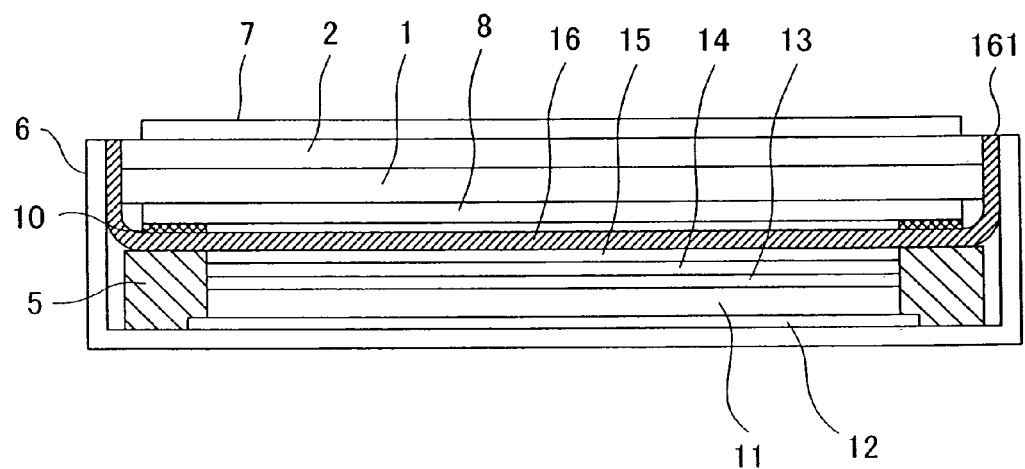
FIG. 9 is a sectional view showing still another form of the first embodiment.

Even in this case, the present invention can be applied in the same manner. FIG. 9 shows the situation. FIG. 9 shows another example of the A-A section of the structure shown in FIG. 1. FIG. 9 is different from FIG. 3 at a point that the lower sheet polarizer 8 of the liquid crystal display panel is attached to the light interceptive member 10. In FIG. 9, the spacer portions of the upper diffuse sheet 16 are placed in the top recesses 51 of the resin mold 5. Incidentally, the lower sheet polarizer 8 of the liquid crystal display panel is placed directly on the portion of the resin mold 5, in which the top recesses 51 are not formed, with the light interceptive member 10 between them.

In FIG. 9, there is a space between the lower sheet polarizer 8 of the liquid crystal display panel and the upper diffuse sheet 16. The space is formed due to the thickness of the light interceptive member 10 and is therefore very small. In FIG. 9, the upper diffuse sheet 16 alone is used as the spacer. For a larger thickness of the spacer, multiple optical sheets are employed as mentioned in relation to the example shown in FIG. 3 or the like.

In the foregoing examples, the number of optical sheets is four. For some products, the upper diffuse sheet 16 may be excluded by applying a material that exerts a diffuse effect, for example, a diffuse adhesive to the lower sheet polarizer 8. In this case, other optical sheet is substituted for the upper diffuse sheet 16. Any of three optical sheets may be adopted, or multiple sheets or all the three sheets may be used.

Figure 10:
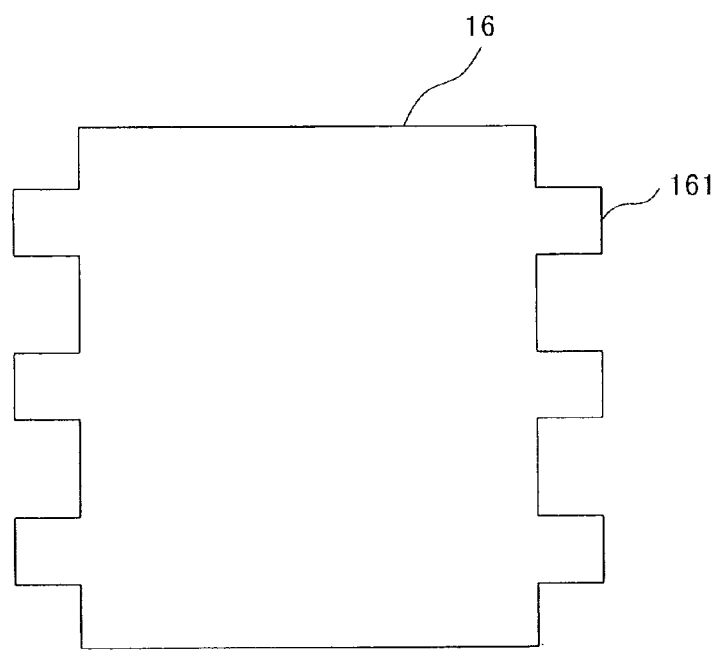
FIG. 10 shows still another form of the upper diffuse sheet.

In the aforesaid embodiment, the spacer portions of an optical sheet constituting the spacer 161 are formed in twos on the long sides of the optical sheet. However, the number of spacer portions on each long side need not be confined to two. As shown in FIG. 10, three spacer portions may be formed on each long side if necessary, or three or more spacer portions may be formed thereon. Otherwise, only one relatively large spacer may be formed on each long side. In either case, since each optical sheet is thin, the optical sheet can be easily bent to be used as a spacer. If necessary, each optical sheet may be shaped like the one shown in FIG. 8. Thus, bending the spacer portions gets easier.

Second Embodiment

Figure 11A:
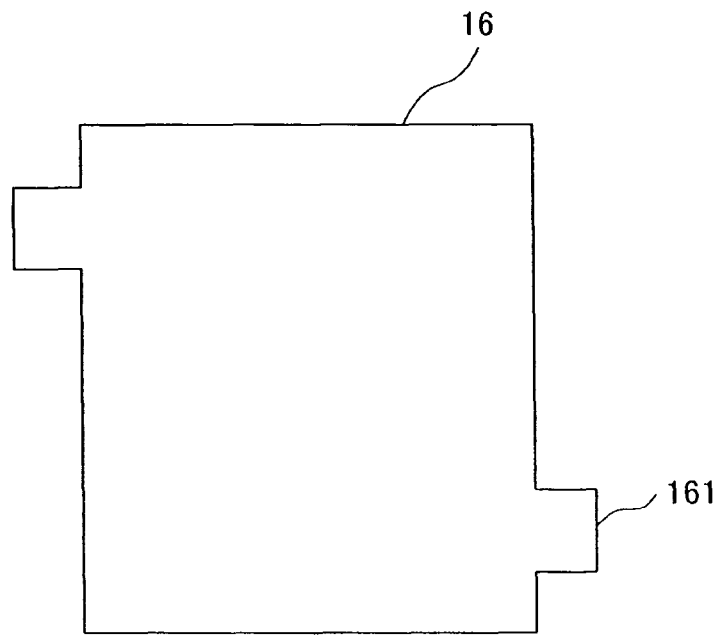
FIG. 11A and FIG. 11B show examples of optical sheets employed in a second embodiment.
Figure 11B:
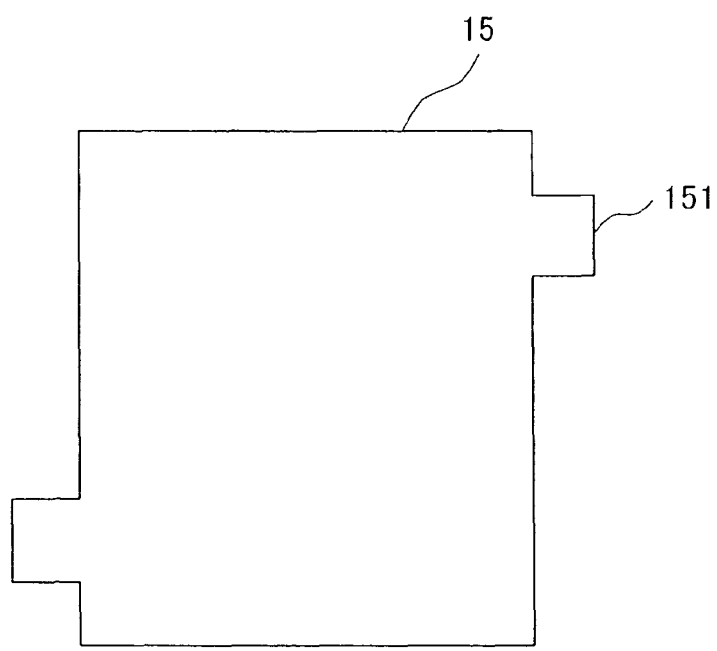

FIG. 11A shows the shape of an optical sheet to be used as the spacer 161 in the second embodiment. In the second embodiment, multiple optical sheets are used to complete a spacer between the glass substrate of the liquid crystal display panel and the frame 6. FIG. 11A shows a case where juts serving as the spacer 161 are formed at a left upper position and a right lower position respectively on the upper diffuse sheet 16. The spacer 161 shown in FIG. 11A does not fully fill the role of a spacer. In FIG. 11B, juts serving as a spacer 151 are formed at a left lower position and a right upper position respectively on the upper prism sheet 15 to be used as a spacer. The spacer 161 of the upper diffuse sheet shown in FIG. 11A and the spacer 151 of the prism sheet 15 shown in FIG. 11B are used to form a well-balanced spacer between the glass substrate of the liquid crystal display panel and the frame 6.

Figure 12:
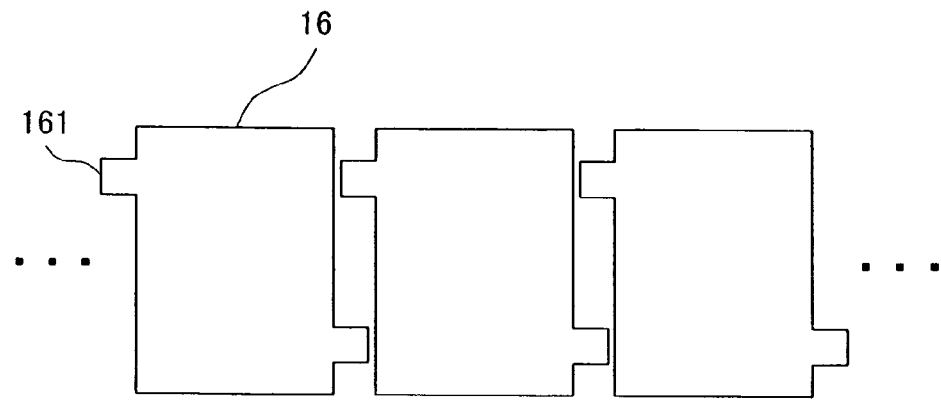
FIG. 12 shows an example of arrangement of products of an upper diffuse sheet, which is employed in the second embodiment, in the process of manufacturing.

The merit of the above construction is that a material yield can be upgraded as shown in FIG. 12. Although juts serving as a spacer and being formed on an optical sheet are small, when press working is adopted for the formation, the material yield is degraded a little. When products of an optical sheet are delineated and pressed as shown in FIG. 12, the material yield can be upgraded. FIG. 12 shows an example of the upper diffuse sheet 16. Needless to say, the same applies to any other sheet, for example, the upper prism sheet.

Figure 13:
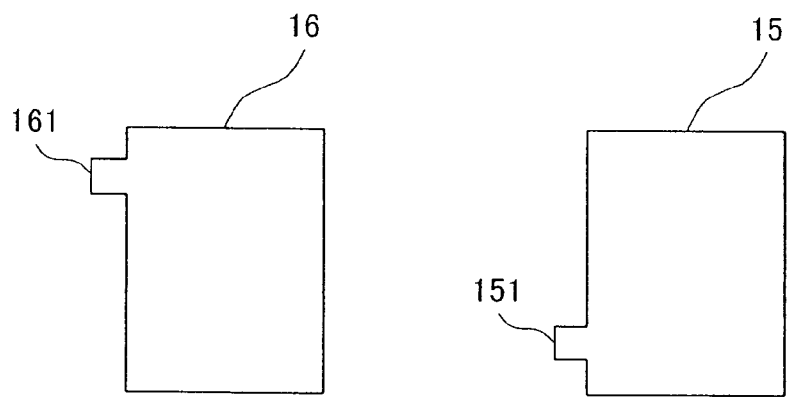
FIG. 13 show still another form of the optical sheets employed in the second embodiment.
Figure 13:
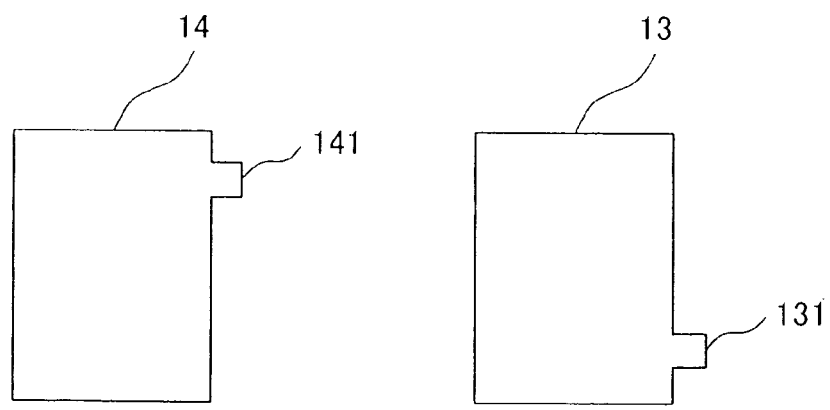

FIG. 13 shows another form of the present embodiment. In FIG. 13, one spacer is formed from each of optical sheets, that is, the spacer 161 is formed from the upper diffuse sheet 16, the spacer 151 is formed from the upper prism sheet 15, a spacer 141 is formed from the lower prism sheet 14, and a spacer 131 is formed from the lower diffuse sheet 13. The merit of this construction is that when optical sheets are assembled to complete a backlight, the optical sheets can be prevented from being left unincorporated. Since the optical sheets are thin and small, even if any of the optical sheets is left unincorporated during assembling, the fact is not readily recognized. After a product is completed, the fact is revealed to degrade a manufacture yield.

As shown in FIG. 13, assuming that each sheet has a jut portion serving as a spacer, when optical sheets or the like are stored in a resin mold, whether all the optical sheets have been inserted can be decided by checking if the spacers exist in the top recesses 51 of the resin mold 5. In this case, the thicknesses of the sheets may be slightly different from one another, the difference is on the order of 0.01 mm and poses no problem in terms of the capability of a spacer.

Third Embodiment

The first and second embodiments are concerned with cases where spacer portions of an optical sheet are formed on the long sides of a liquid crystal display panel. The present embodiment is concerned with a case where spacer portions are formed even on a short side of the liquid crystal display panel. On one of the short sides of the liquid crystal display panel on which the flexible wiring substrate 3 is disposed, the flexible wiring substrate 3 fills the role of a spacer between the liquid crystal display panel and the frame 6 so as to prevent the glass substrate of the liquid crystal display panel and the frame 6 made of a metal from coming into contact with each other. Consequently, in the present embodiment, spacer portions are formed on the short side of the liquid crystal display panel opposite to the side thereof on which the flexible wiring substrate 3 is disposed.

Figure 14:
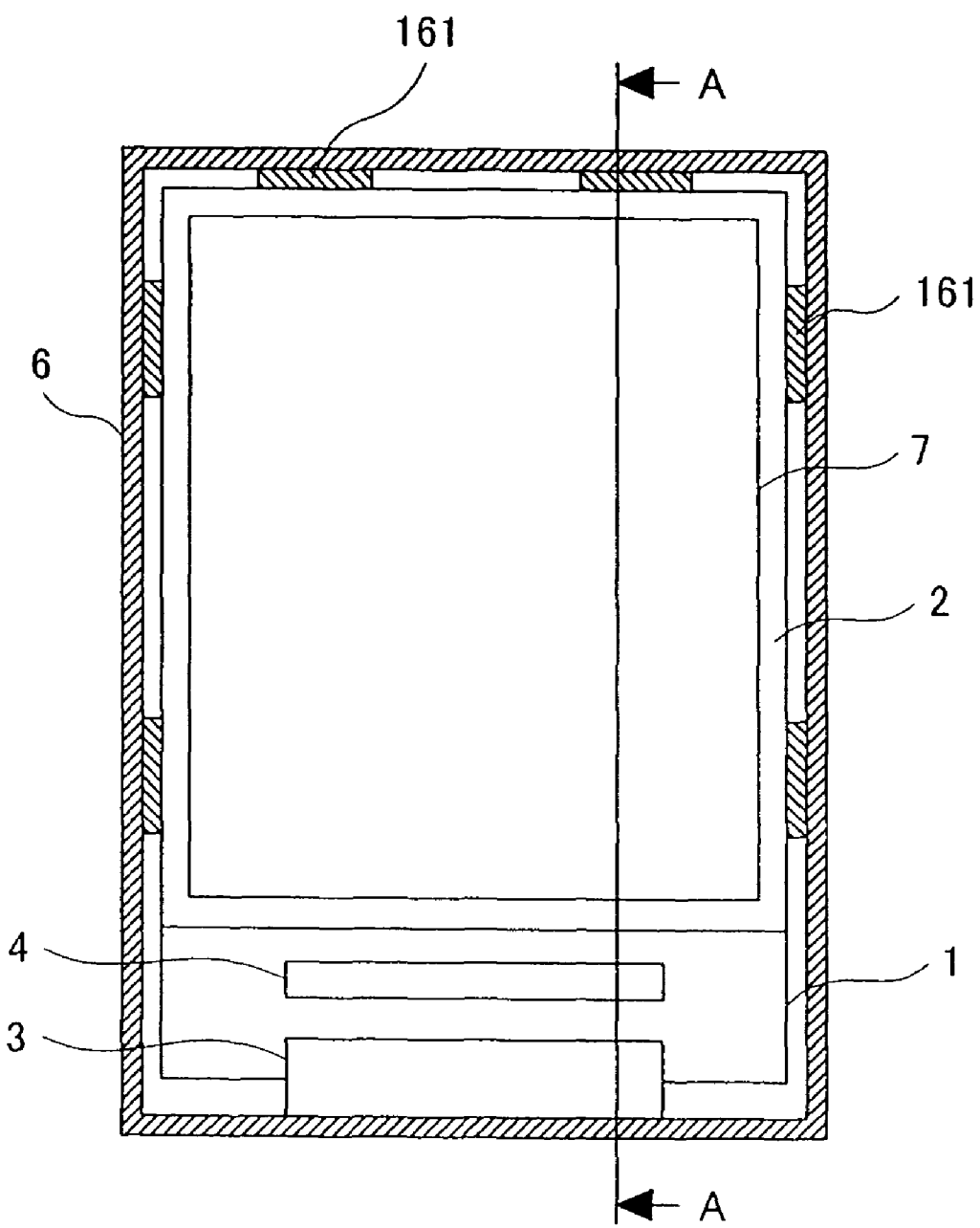
FIG. 14 is a plan view of a third embodiment.

FIG. 14 is a plan view of the present embodiment, and is identical to FIG. 1 showing the first embodiment except that spacer portions included in a spacer 161 are interposed between the short side of the liquid crystal display panel and the frame 6. On the short side, the spacer portions included in the spacer 161 are disposed away from the center of the short side. This is because a liquid crystal injection hole is formed at the center of the short side of the liquid crystal display panel.

Figure 15:
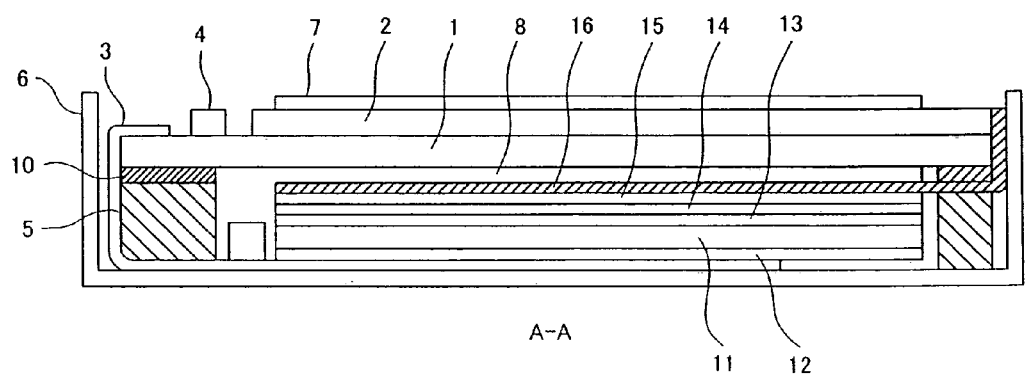
FIG. 15 is an A-A sectional view of the third embodiment.

FIG. 15 is an A-A sectional view of the structure shown in FIG. 14. In FIG. 15, the spacer 161 including jut portions of the upper diffuse sheet 16 is interposed between the glass substrate of the liquid crystal display panel and the frame 6 on the side of the liquid crystal display panel opposite to the side thereof on which the flexible wiring substrate 3 is disposed. Similarly to the first embodiment, recesses in which the jut portions of the upper diffuse sheet 16 are placed are formed on the top of the resin mold.

Figure 16:
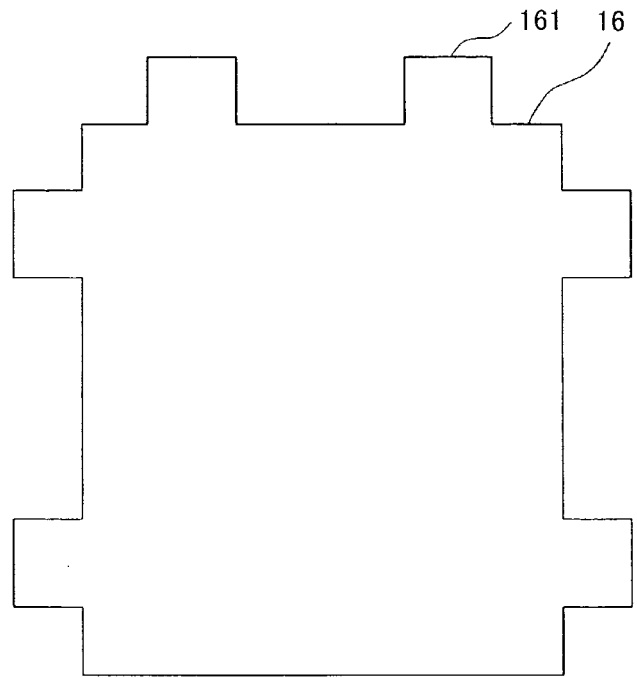
FIG. 16 shows the shape of an upper diffuse sheet employed in the third embodiment.

FIG. 16 shows the upper diffuse sheet 16 employed in the display device shown in FIG. 14. The jut portions included in the spacer 161 are formed at two positions on the short side in the same manner as they are on the long sides. FIG. 16 shows an example in which the upper diffuse sheet 16 serves as the spacer. The spacer is not limited to the upper diffuse sheet 16 but may be the upper prism sheet or any other optical sheet. Moreover, as described in relation to the first embodiment, spacer portions of multiple optical sheets may be layered in order to increase the space between the liquid crystal display panel and the frame 6. The space between the liquid crystal display panel and the frame 6 may have to be different between the short sides and the long sides. In this case, the space between the glass substrate and the frame 6 can be varied by changing the number of spacers realized by optical sheets so that the space will be different between the long sides and short sides.

Figure 17A:
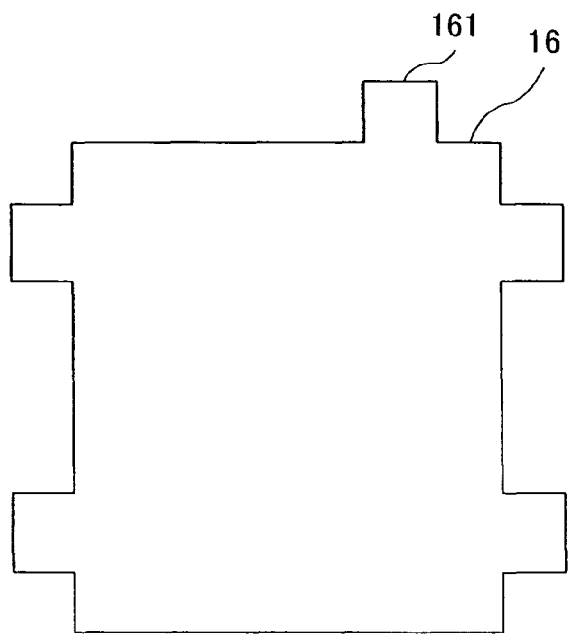
FIG. 17A and FIG. 17B show another examples of optical sheets employed in the third embodiment.
Figure 17B:
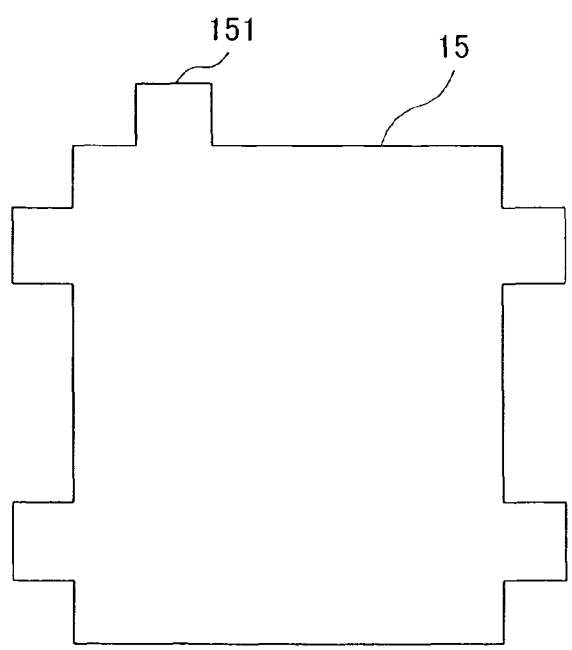
Figure 18:
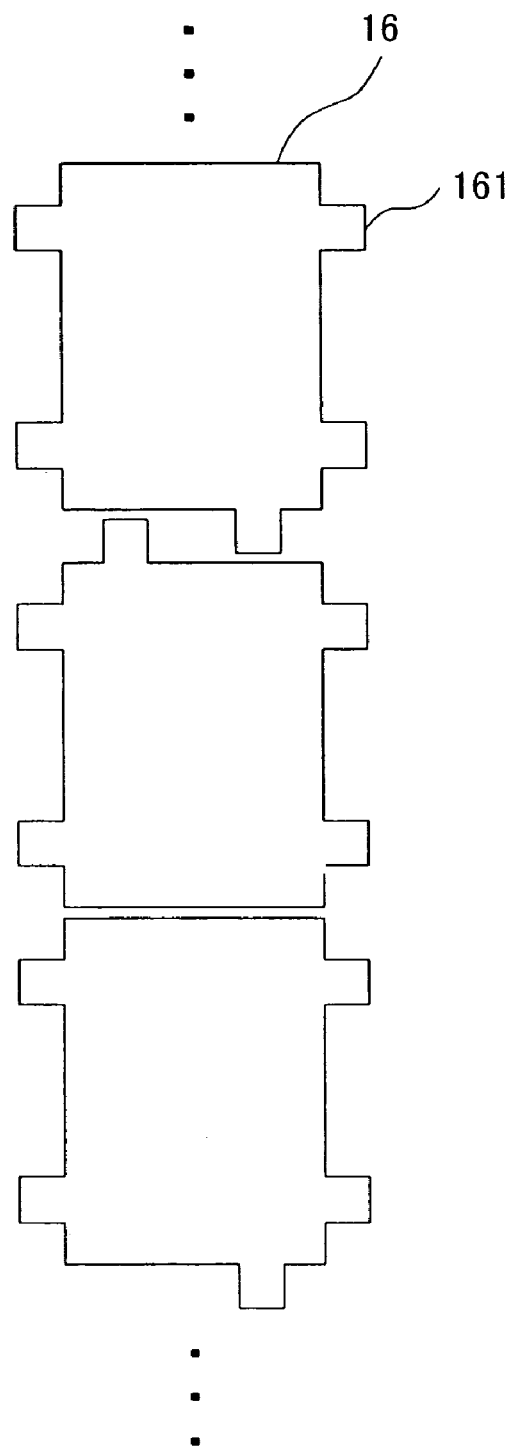
FIG. 18 shows an example of arrangement of products of an upper diffuse sheet, which is employed in the third embodiment, in the process of manufacture.

FIG. 17A and FIG. 17B show an example in which two optical sheets are used to complete a spacer on the short side. Specifically, FIG. 17A shows one spacer 161 formed on the short side of the upper diffuse sheet 16, and FIG. 17B shows one spacer 151 formed on the short side of the upper prism sheet 15. The upper diffuse sheet 16 and upper prism sheet 15 are combined to balance a spacer. The construction features that even when a spacer is formed on the short side of an optical sheet, the degradation in a material yield in a longitudinal direction in FIG. 18 can be substantially prevented.

Moreover, when all optical sheets have spacer portions, the optical sheets can be, as mentioned in relation to the first embodiment, prevented from being left unincorporated. As a marker for preventing any optical sheet from being left unincorporated, a spacer on the long sides and a spacer on the short side can be, needless to say, used in combination.

Fourth Embodiment

Figure 19:
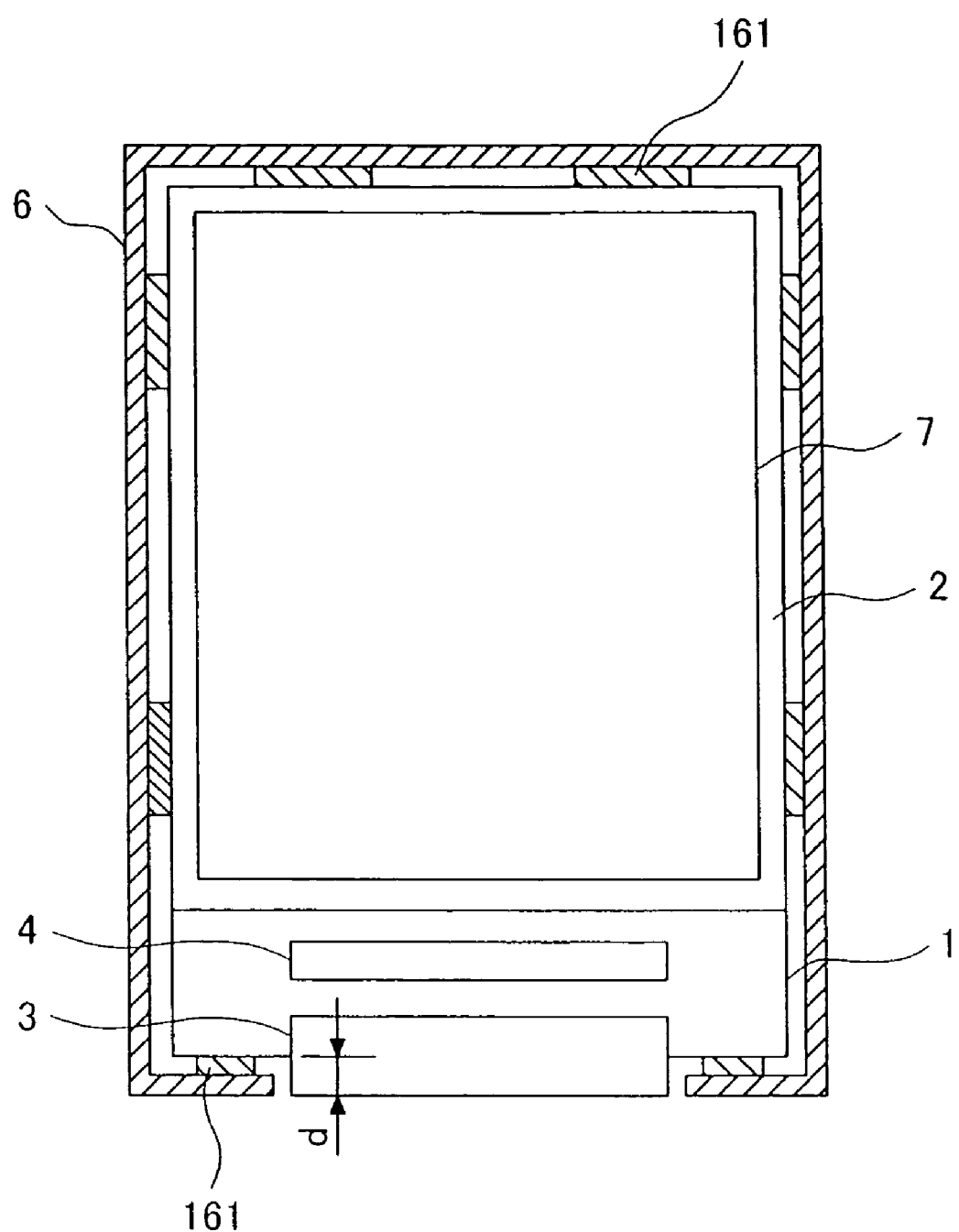
FIG. 19 is a plan view of a fourth embodiment.

FIG. 19 shows the fourth embodiment of the present invention. The flexible wiring substrate 3 is attached to the short side of the TFT substrate 1 of the liquid crystal display panel, and is folded down to the back of the backlight. In the first to third embodiments, the flexible wiring substrate 3 is used as a spacer on the short side for preventing the contact between the liquid crystal display panel and the frame 6.

However, the flexible wiring substrate 3 has a laminated structure, and is thicker than optical sheets are. When the flexible wiring substrate 3 is folded down toward the back of the backlight, a magnitude by which the flexible wiring substrate 3 juts out is equal to or larger than the thickness of the flexible wiring substrate 3 because of a bending stress. The exterior of the frame 6 has to be large enough to absorb the magnitude of jutting. This is not preferable in terms of reduction of the exterior of the liquid crystal display device.

In the present embodiment, a portion of the frame 6 corresponding to the position of the flexible wiring substrate 3 is notched. Thus, an increase in the external dimensions derived from folding down of the flexible wiring substrate 3 to the back of the backlight can be suppressed. However, in this case, the short side of the TFT substrate 1 of the liquid crystal display panel and the short side of the frame 6 come into contact with each other. For prevention of the contact, the present invention has, as shown in FIG. 19, a spacer 161 formed with portions of an optical sheet near the corners on the short side of the frame.

Figure 20:
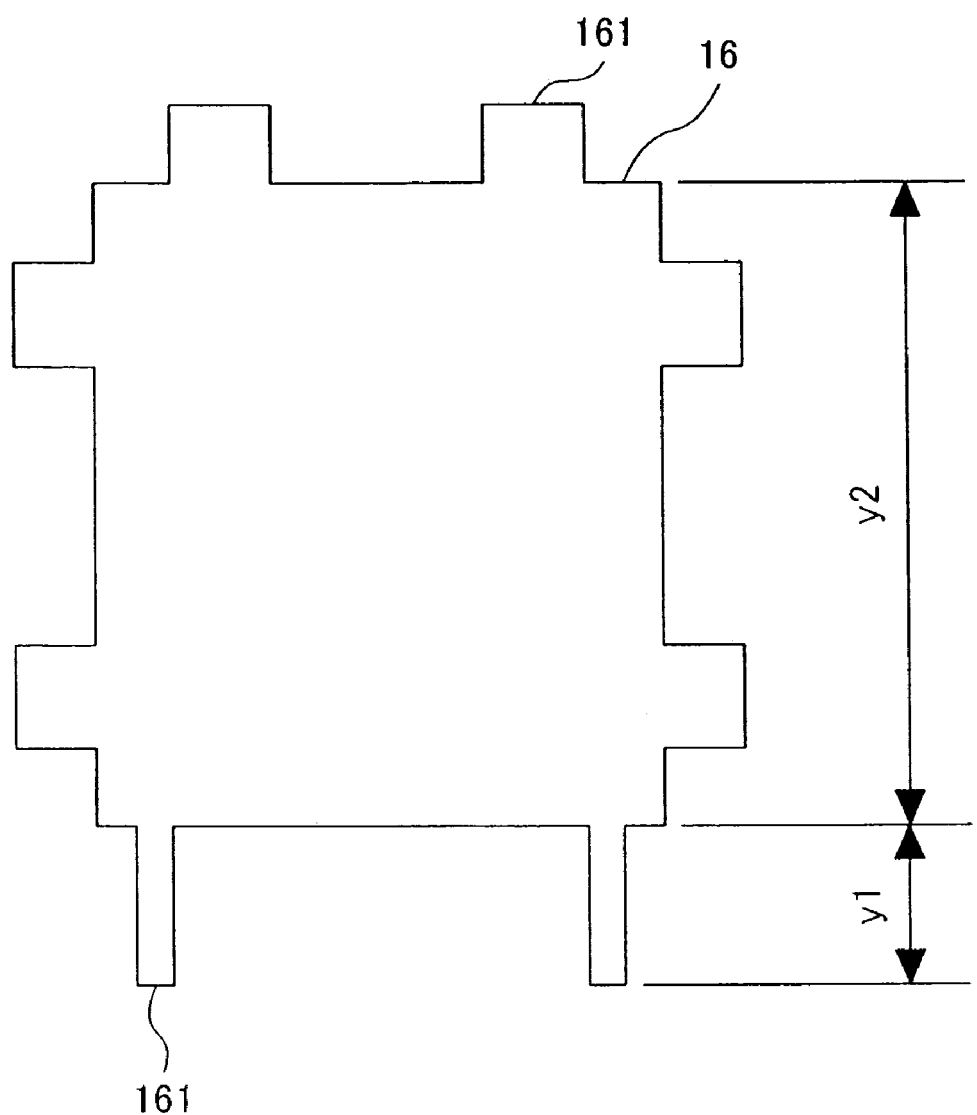
FIG. 20 shows the shape of an upper diffuse sheet employed in the fourth embodiment.

FIG. 20 shows an example of the shape of the upper diffuse sheet 16 employed in the present embodiment. In FIG. 20, jut portions constituting a spacer 161 are formed on the short sides of the TFT substrate 1 to which the flexible wiring substrate 3 is attached. The dimension y1 of the jut portions extended outward is larger than the jut portions on the other sides. Optical sheets generally have the same size as the size of the color filter substrate 2. In this embodiment, the spacer portions have to extend to reach the edge of the TFT substrate 1 to which the flexible wiring substrate 3 is attached. Instead of increasing the dimension y1 of the jut portions, the length y2 of the diffuse sheet itself may be increased. Whichever of the dimension y and the length y2 is increased should be determined from the viewpoint of a material yield.

Even in this case, needless to say, adjustment of the space between the liquid crystal display panel and the frame 6 using multiple optical sheets, or usage of multiple optical sheets to complete a spacer between the liquid crystal display panel and the frame 6 for the purpose of upgrading a material yield of each optical sheet, which has been described in relation to the first embodiment, can be applied to the present embodiment.

Figure 21:
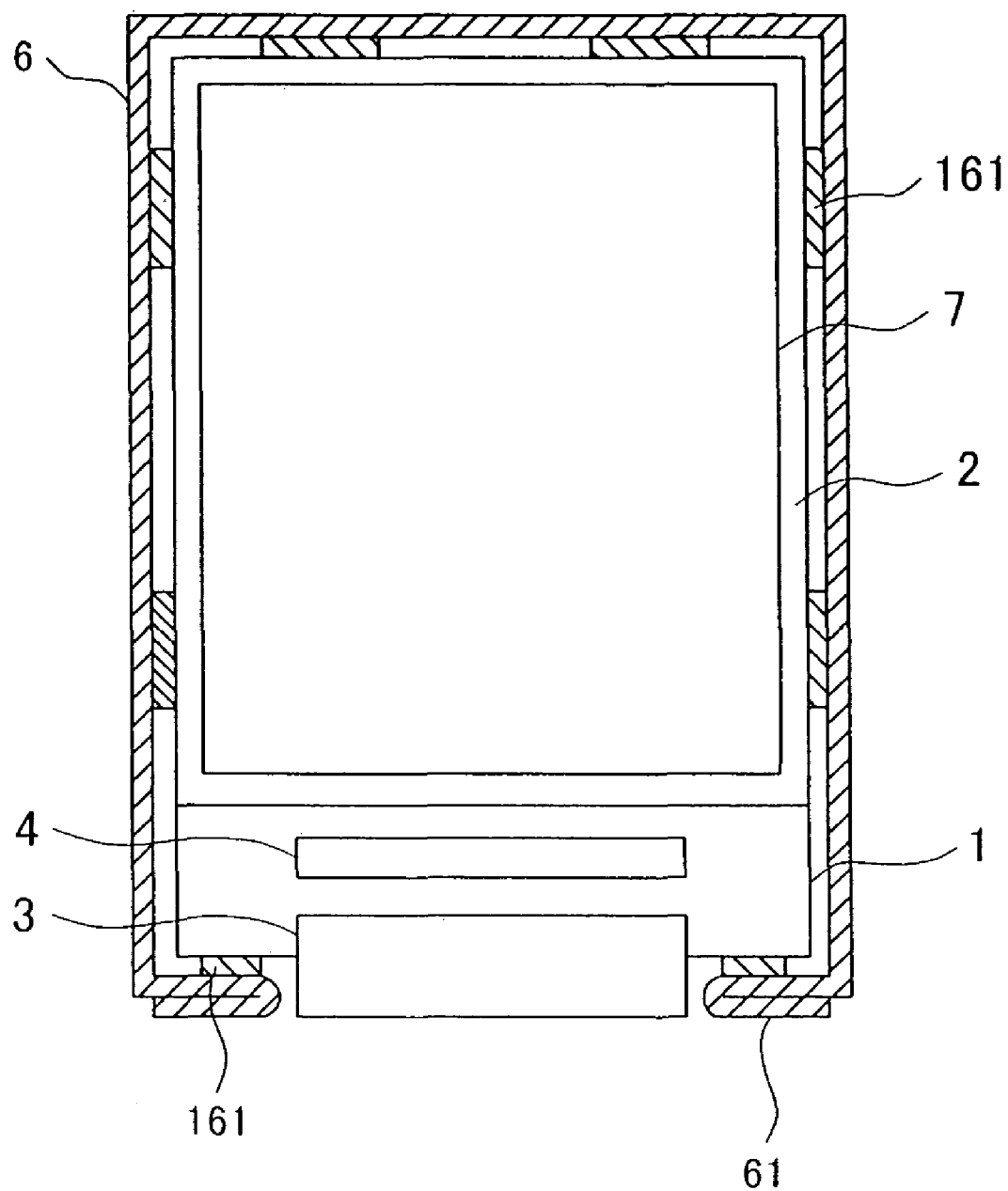
FIG. 21 is a plan view of another form of the fourth embodiment.

FIG. 21 shows another form of the present embodiment. In the form shown in FIG. 19, the ends of the notched portion of the frame 6 are unstable and readily deformed with external force. For example, if the frame were deformed inward due to the external force, the ends of the frame made of a metal would come into contact with the TFT substrate 1 of the liquid crystal display panel. This brings about a fear that the TFT substrate 1 may be cracked. In FIG. 21, the notched portion of the frame 6 is provided with hemmed portions 61 in order to prevent the ends of the notched portion from being deformed with the external force. The other components are identical to those shown in FIG. 19.

Figure 22:
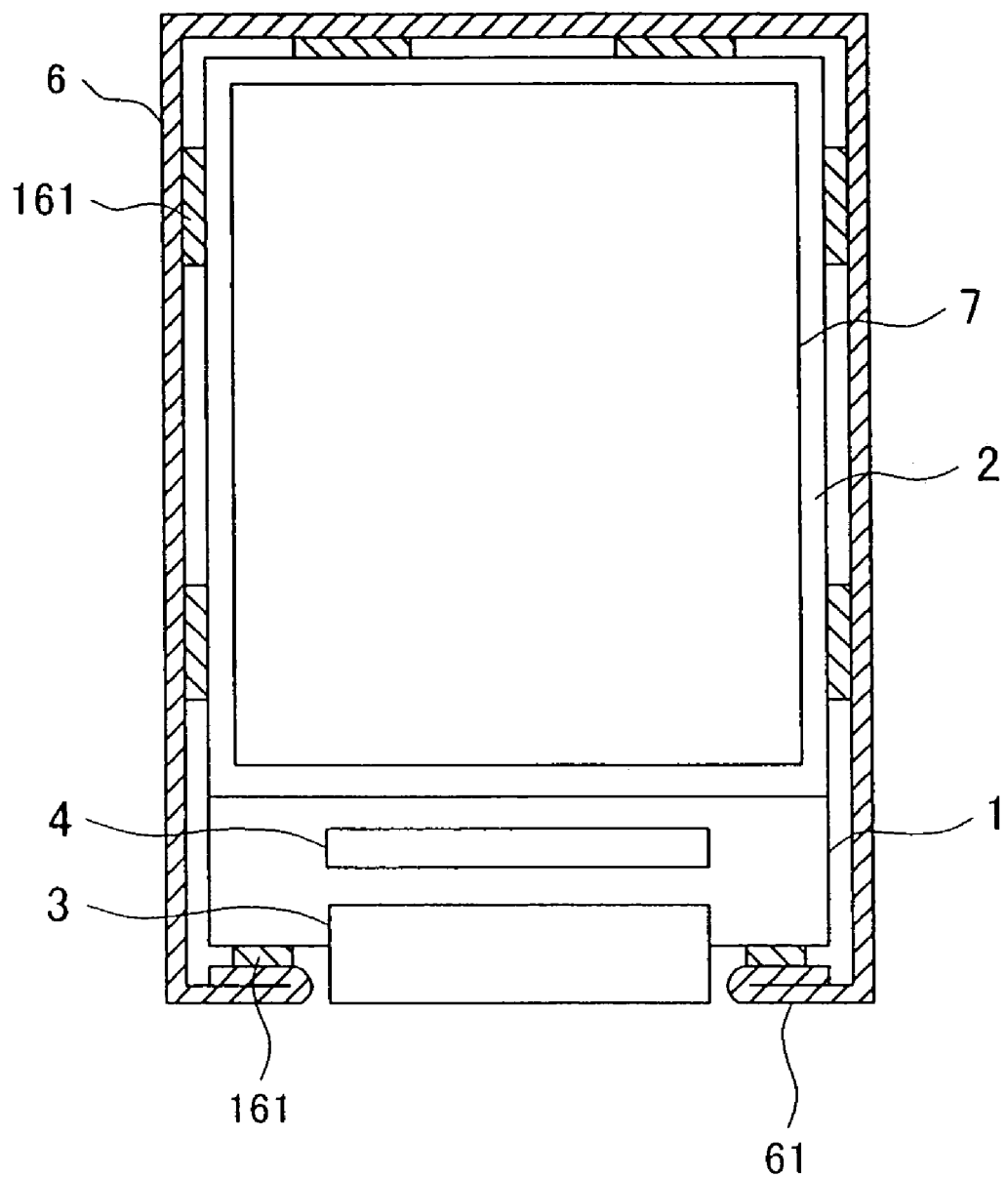
FIG. 22 is a plan view of still another form of the fourth embodiment.

FIG. 22 shows another form of the present embodiment. Even in this form, the notched portion of the frame 6 is hemmed in order to upgrade the strength of the notched portion of the frame for the purpose of preventing deformation. In the example shown in FIG. 22, since the hemmed or folded ends exist on the periphery of the frame, the ends are liable to interfere with the outside and are accordingly susceptible to external force to be imposed on the frame 6. In the present embodiment, the ends to be formed as the hemmed portions 61 are folded down to the internal side of the frame 6 in order to decrease the number of occasions on which the ends interfere with the outside. In the present embodiment, the number of occasions on which the frame 6 is deformed can be decreased accordingly. At the same time, the number of occasions on which the TFT substrate 1 and the frame 6 come into contact with each other can be decreased.

Figure 23:
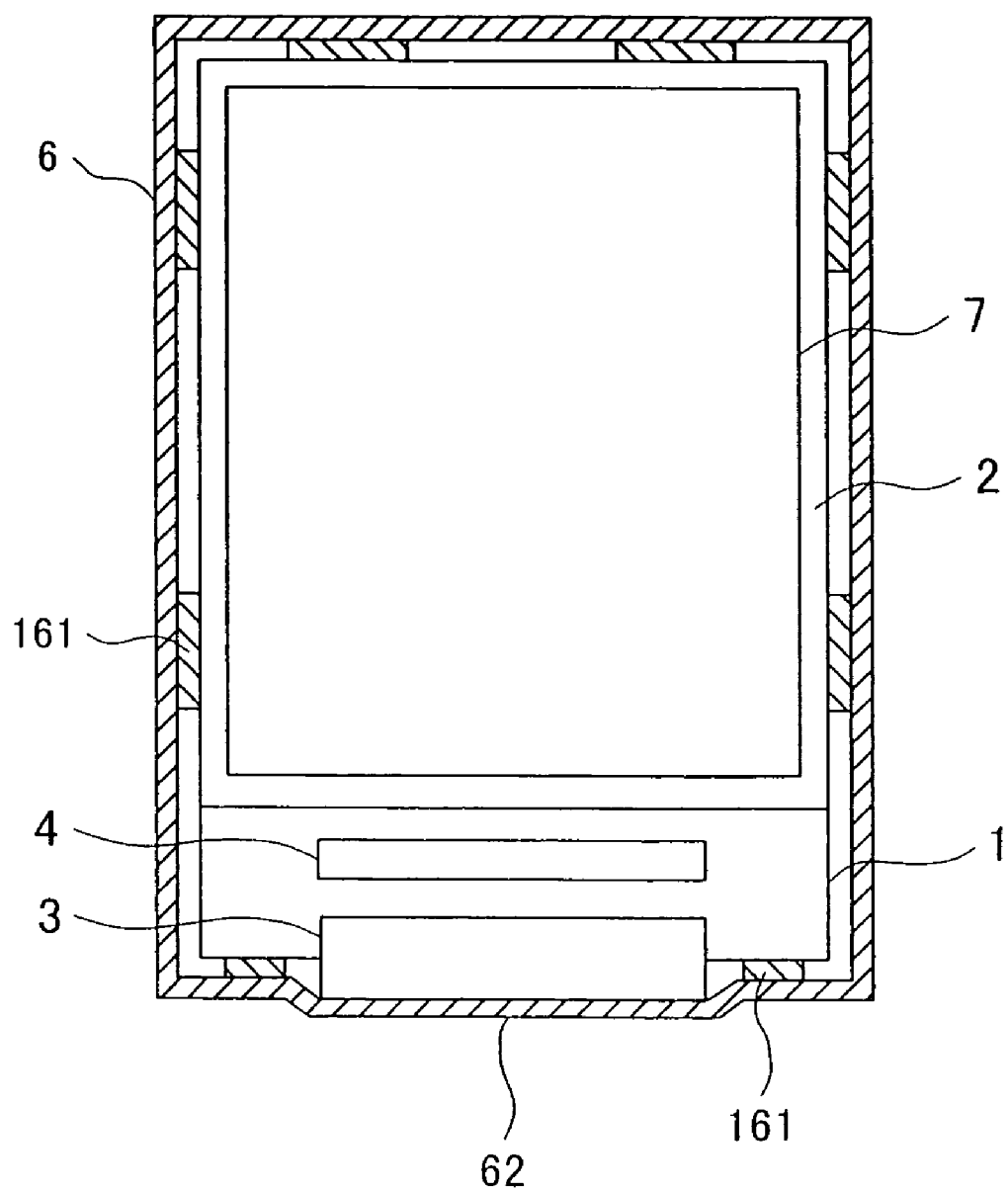
FIG. 23 is a plan view of still another form of the fourth embodiment.
Figure 24:
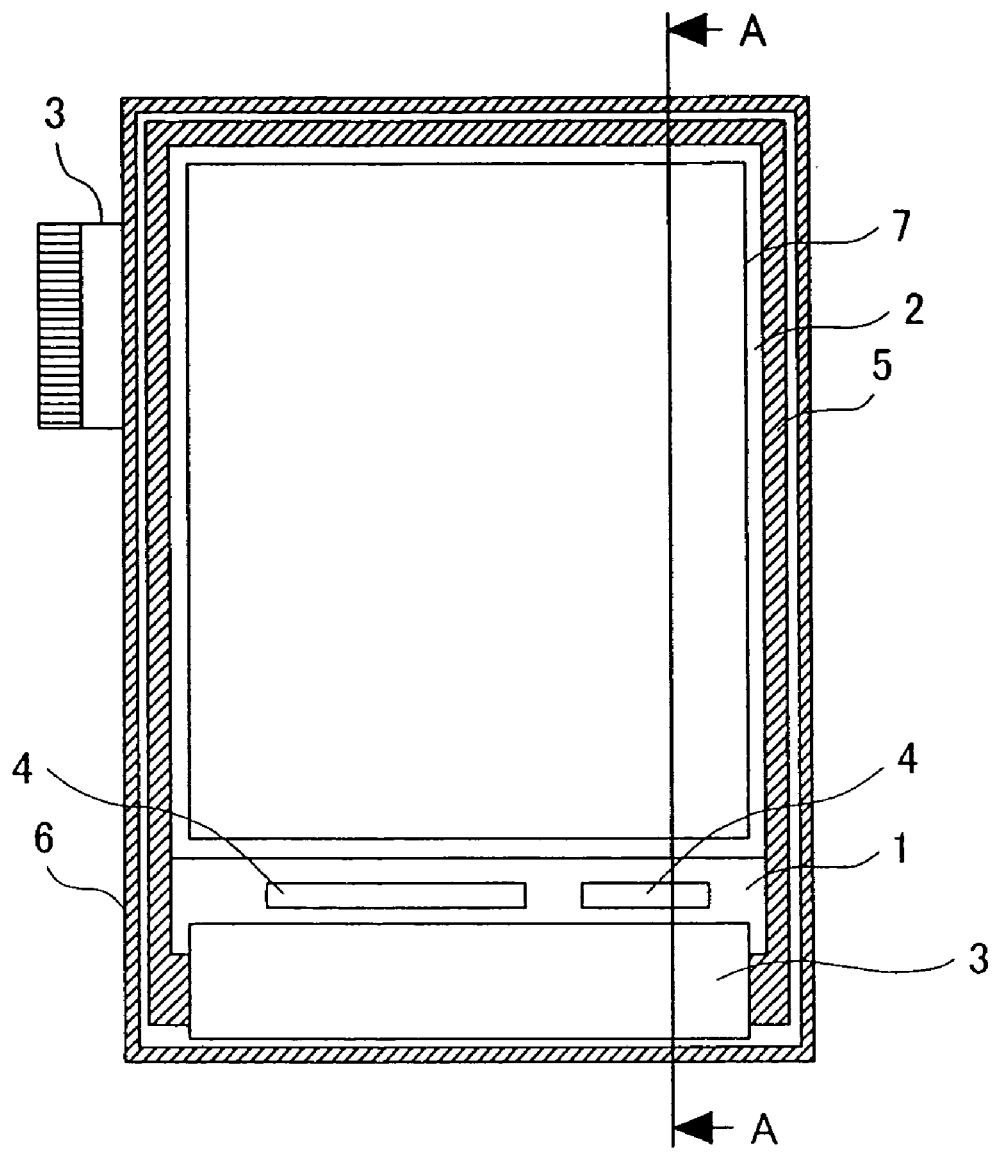
FIG. 24 is a plan view showing a related art.

FIG. 23 shows still another form of the present embodiment. In this form, the frame 6 is not notched, but the portion of the frame 6 corresponding to the position of the flexible wiring substance 3 is jutted out. The space between the TFT substrate 1 and the frame 6 is sustained by the spacer 161 formed from the upper diffuse sheet 16. According to the present embodiment, since only a required portion of the frame 6 is formed as the jut portion 62, the exterior of the entire display device can be reduced. Moreover, on the short side of the TFT substrate 1 to which the flexible wiring substrate 3 is attached, the space can be sustained by the spacer realized by the optical sheet. Consequently, the space can be set to a small value, and the contact between the TFT substrate 1 and the frame 6 can be reliably prevented.

What is claimed is:

1. A liquid crystal display device comprising:
  a liquid crystal display panel including a TFT substrate in which pixel electrodes and TFTs each of which controls a signal to be sent to the pixel electrode are disposed in the form of a matrix, and a color filter substrate in which color filters associated with the pixel electrodes are formed;
  a backlight including a plurality of optical sheets and being placed on the back of the liquid crystal display panel; and
  a frame accommodating the liquid crystal display panel and the backlight, wherein: the frame has a lateral internal wall;
  each of the optical sheets includes a bend portion that is bent along the lateral internal wall of the frame, and
  wherein the bend portions of the plurality of optical sheets are layered to lie between the lateral internal wall of the frame and the liquid crystal display panel.

2. The liquid crystal display device according to claim 1, wherein the bend portions of the plurality of optical sheets are located in different places between the lateral internal wall of the frame and the liquid crystal display panel.

3. A liquid crystal display device comprising:
  a liquid crystal display panel including a TFT substrate in which pixel electrodes and TFTs each of which controls a signal to be sent to the pixel electrode are disposed in the form of a matrix, and a color filter substrate in which color filters associated with the pixel electrodes are formed;
  a backlight including a plurality of optical sheets and being placed on the back of the liquid crystal display panel; and
  a frame accommodating the liquid crystal display panel and the backlight, wherein: the frame has a lateral internal wall, wherein
  each of the optical sheets includes a bend portion that is bent along the lateral internal wall of the frame, and
  wherein the bend portions of the plurality of optical sheets are located in different places between the lateral internal wall of the frame and the liquid crystal display panel.

4. The liquid crystal display device according to claim 1, wherein the bend portions of the plurality of optical sheets are layered to lie between the lateral internal wall of the frame and the liquid crystal display panel.

* * * * *